United States Patent
Zhang et al.

(10) Patent No.: US 9,830,231 B2
(45) Date of Patent: *Nov. 28, 2017

(54) PROCESSES AND METHODS FOR CLIENT-SIDE FINGERPRINT CACHING TO IMPROVE DEDUPLICATION SYSTEM BACKUP PERFORMANCE

(71) Applicant: Symantec Corporation, Mountain View, CA (US)

(72) Inventors: Xianbo Zhang, Madison, WI (US); Thomas Hartnett, Saint Paul, MN (US); Weibao Wu, Vadnais Heights, MN (US)

(73) Assignee: Veritas Technologies LLC, Mountain View, CA (US)

( * ) Notice: Subject to any disclaimer, the term of this patent is extended or adjusted under 35 U.S.C. 154(b) by 417 days.

This patent is subject to a terminal disclaimer.

(21) Appl. No.: 14/524,397

(22) Filed: Oct. 27, 2014

(65) Prior Publication Data

US 2015/0046403 A1 Feb. 12, 2015

Related U.S. Application Data

(63) Continuation of application No. 13/026,188, filed on Feb. 11, 2011, now Pat. No. 8,874,520.

(51) Int. Cl.
*G06F 17/30* (2006.01)
*G06F 11/14* (2006.01)

(52) U.S. Cl.
CPC ...... *G06F 11/1458* (2013.01); *G06F 11/1453* (2013.01)

(58) Field of Classification Search
None
See application file for complete search history.

(56) References Cited

U.S. PATENT DOCUMENTS

| | | |
|---|---|---|
| 7,587,398 B1 | 9/2009 | Fredricksen et al. |
| 7,676,503 B2 | 3/2010 | Van Ingen et al. |
| 8,166,261 B1 | 4/2012 | Cremelie et al. |
| 8,214,428 B1 | 7/2012 | Christiaens |
| 8,874,520 B2 | 10/2014 | Zhang |
| 2005/0283356 A1* | 12/2005 | Wang ............... H04L 67/06 704/2 |
| 2009/0217091 A1 | 8/2009 | Miyamoto et al. |
| 2010/0094817 A1* | 4/2010 | Ben-Shaul ......... G06F 3/0608 707/697 |
| 2010/0223441 A1 | 9/2010 | Lillibridge et al. |
| 2010/0250858 A1 | 9/2010 | Cremelie et al. |

(Continued)

FOREIGN PATENT DOCUMENTS

WO  WO 03/019412  3/2003  ............ G06F 17/30

*Primary Examiner* — Sangwoo Ahn
(74) *Attorney, Agent, or Firm* — Campbell Stephenson LLP

(57) ABSTRACT

A system and method for caching fingerprints in a client cache is provided. A data object that comprises a set of data segments and describes a backup process is identified. Thereafter, a request referencing the data object is made to a deduplication server to request that a task identifier be added to the data object. If the deduplication server is able to successfully add the task identifier to the data object, then an active identifier is added to each data segment from the set of data segments in a cache that is within a client system.

18 Claims, 12 Drawing Sheets

(56) References Cited

U.S. PATENT DOCUMENTS

2010/0312752 A1 12/2010 Zeis et al.
2012/0173558 A1 7/2012 Sorenson, III
2012/0191669 A1 7/2012 Kennedy et al.
2012/0233417 A1 9/2012 Kalach
2014/0101113 A1 4/2014 Zhang et al.

* cited by examiner

PROCESSES AND METHODS FOR CLIENT-SIDE FINGERPRINT CACHING TO IMPROVE DEDUPLICATION SYSTEM BACKUP PERFORMANCE

CROSS-REFERENCE TO RELATED APPLICATIONS

The present patent application is a continuation of U.S. patent application Ser. No. 13/026,188, filed on Feb. 11, 2011, entitled "Processes and Methods For Client-Side Fingerprint Caching To Improve Deduplication System Backup Performance" and is incorporated by reference herein in its entirety and for all purposes as if completely and fully set forth herein.

FIELD OF THE INVENTION

This invention relates to deduplication system backups, and more particularly, to caching fingerprints to improve deduplication backup performance.

DESCRIPTION OF THE RELATED ART

Performing a backup typically involves backing up a stream of data, for example, in the form of files. These files can be broken down into multiple units of data, such as data segments. There is often times a degree of repetition in such data, and so contemporary (backup) strategies employ deduplication techniques. These backup processes include determining if a deduplication server has a data segment currently stored in backup. In addition, the backup process can also include determining if the deduplication server will retain each of these data segments in storage throughout the life of a backup process.

These determinations are usually made via queries or messages sent and received by the client and the deduplication server. These queries and messages are transmitted, for example, via any network, where each query and/or message translates into additional time and networking costs for each backup operation.

Thus, it is desirable to minimize the amount of overall queries and messages exchanged between a client system and a deduplication server during a backup process, in an effort to speed up the backup process, minimize networking costs, and reduce additional load on a server, while ensuring that no data loss occurs between the two systems.

SUMMARY OF THE INVENTION

Various systems and methods for caching fingerprints at a client are disclosed. For example, one method involves identifying a first data object including a set of data segments. This first data object is used to describe a backup process. Once identified, a request is made to a deduplication server to request that an active task identifier be added to the first data object. Such a request when makes includes a reference to the first data object. If the deduplication server is able to successfully add a task identifier to the first data object, then an active identifier is added to each data segment from the set of data segments in a cache that is located within a client system. In one embodiment, an active identifier is added to a reference list corresponding to each data segment from the set of data segments.

In another embodiment, the first data object is received from the deduplication server in response to a query from the client system. This query is a query for a data object that includes a fingerprint match for the set of data segments. This type of query is performed prior to performing an initial full backup on the client system.

The method can also include performing a backup process for the client system, after the active identifier is added to each data segment. In one embodiment, a determination is made as to whether a data segment referenced by the backup process needs to be sent to the deduplication server. This determination is made by determining whether a fingerprint for the data segment is in the cache and determining whether the cache has an active designation for the data segment.

In another embodiment a record of the backup process is created upon successful completion of the backup process. This record comprises at least one of backup policy information, a list of data segments referenced by the backup process, a fingerprint of the data object, and a backup type indicator.

In yet another embodiment, the data object describing the backup process is received, a fingerprint for the data object is added to a reference list corresponding to each data segment within the data object, and a task identifier is removed from the data object, upon successful completion of the backup process.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those of skill in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
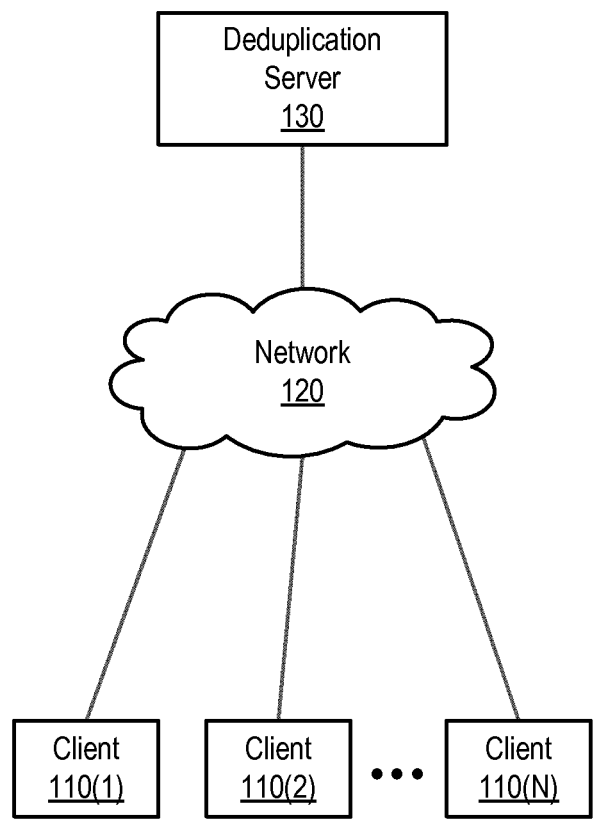
FIG. 1 is a block diagram showing a system for caching fingerprints at a client, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents, and alternatives falling within the spirit and scope of the invention defined by the appended claims.

DETAILED DESCRIPTION

FIG. 1 is a block diagram showing a system for caching fingerprints at a client. A fingerprint is a value generated for a given data segment. Typically, such fingerprint values need to be substantially unique to each data segment, and thus distinguish data segments from one another. An example of a fingerprint is a hash value. Hashing algorithms such as Message-Digest Algorithm 5 (MD5), Secure Hash Algorithm 1 (SHA-1), and Secure Hash Algorithm 256 (SHA-256) and the like can be used to generate such values, for example. FIG. 1 illustrates a system for caching such fingerprints at a client. As shown, FIG. 1 includes N number of clients 110, illustrated as client 110(1), client 110(2) . . . client 110(N), and further depicts a network 120 and a deduplication server 130.

Clients 110 generally represent any type or form of computing device. Examples of clients 110 can include laptops, desktops, servers, and/or combinations of one or more of the same. Clients 110 can initiate a backup process, in the form of a full or incremental backup. A backup process, whether full or incremental, can be described by a data object. A data object corresponds to a backup image that includes the data segments to be backed up during a full or incremental backup.

During a backup, clients 110 can include duplicate data within a set of data to be backed up. In addition, if a set of data is backed up multiple times, the data that is unchanged also results in duplicates of previously backed up data. In order to prevent backing up duplicate data from a client or from multiple clients, backup systems can implement deduplication (e.g., a process for removing duplicate copies of data) in order to preserve storage space when backing up data from client systems. In this case, deduplicated backup data can be stored within deduplication server 130. Deduplication server 130 can include or be part of a backup system that backs up data from a number of different client systems.

Network 120 facilitates communication or data transfers occurring between clients 110 and deduplication server 130. This communication can be made using wired or wireless connections. Examples of network 120 can include a wide area network (WAN), a local area network (LAN), a storage area network (SAN), the Internet, or some combination thereof.

Each communication exchanged between clients 110 and deduplication server 130 during a backup operation translates into operational costs, administrative costs, and overall time needed to complete a backup. Thus, minimizing the number of such round-trip communications needed to perform a backup operation is desirable.

The number of data communications occurring between one of clients 110 and deduplication server 130 can be minimized by using a pre-population technique (performed prior to an initial full backup on the client system) to pre-populate a client's cache with fingerprints corresponding to data segments stored within deduplication server 130 and having data protection during the course of a backup process. By doing so, the client system may not need to send future queries to the deduplication server directed to whether a data segment is currently stored within the deduplication server and whether the data segment is protected from inadvertent deletion during the course of a backup process. Avoiding these additional queries for each data segment translates into a significant reduction in the overall cost and time needed to perform an initial backup operation on a client system.

In addition, data communications exchanged between a client and a deduplication server can also be minimized by using the fingerprint contents of the client's cache to perform subsequent backup processes (e.g., a full or incremental backup performed after the initial full backup on the client). Before fingerprints in a client's fingerprint cache can be used by a client during a backup operation, a cache consistency check is performed to ensure that data segments being referenced by the backup operation will be protected (e.g., not deleted) by the deduplication server, during the course of that backup operation. This approach can be used to protect the data object and the corresponding data segments within the data object. This protection allows the client to track which data segments are currently stored at the deduplication server and protected from inadvertent deletion during the course of a backup process. Thus, the client may not need to query the deduplication server either to determine if the deduplication server has a data segment already stored or, if so, to determine if the deduplication server will retain a data segment throughout the life of a backup operation. Avoiding these additional queries for each data segment can also significantly reduce the overall cost of performing backups, as well as the amount of time needed to perform backups on a client system.

Figure 2A:
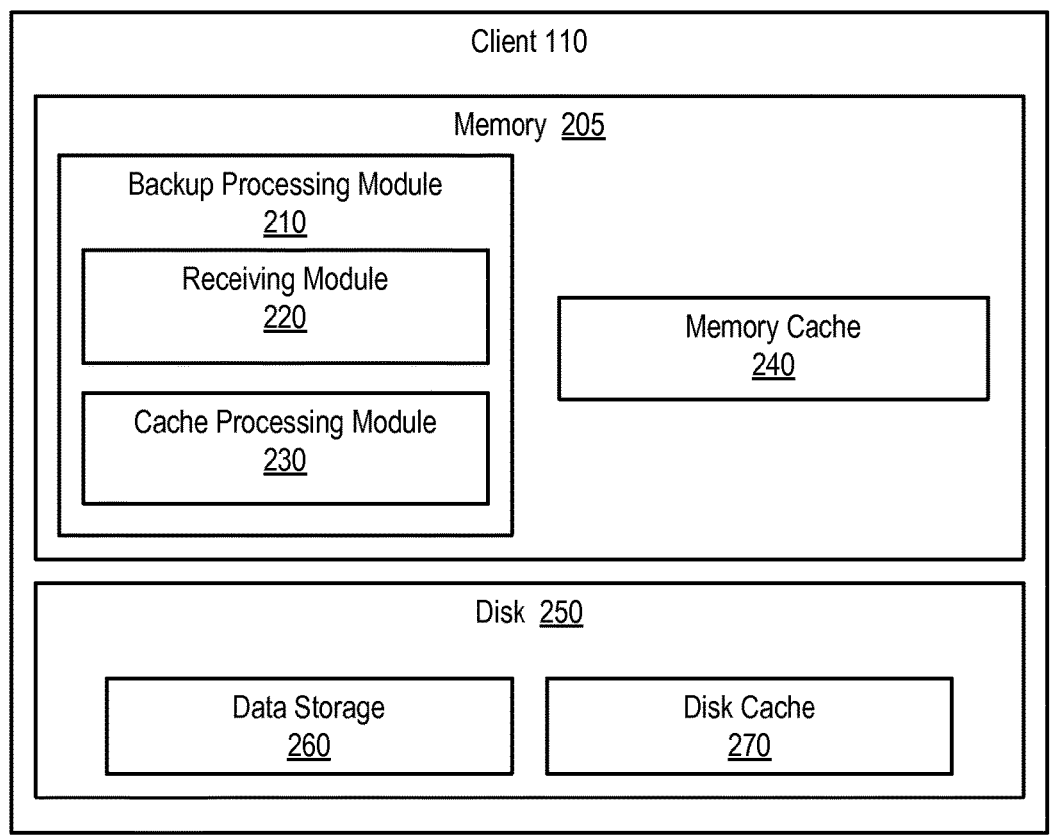
FIG. 2A illustrates an architecture of a client system that supports the caching of fingerprints, according to one embodiment of the present invention.

FIG. 2A illustrates an architecture of a client system that supports the caching of fingerprints. Client system 110 includes a memory 205 (consisting of backup processing module 210, a receiving module 220, a cache processing module 230, and a memory cache 240) and a disk 250 (consisting of a data storage 260 and a disk cache 270).

Backup processing module 210 coordinates a backup process performed on some or all of the data stored at client 110. A backup process performed on client 110 can be a full backup or an incremental backup. A full backup is performed to backup a given subset (or all) of the data within data storage 260. By contrast, an incremental backup is performed to back up portions of data that have changed since the previous full or incremental backup.

During a backup process, backup processing module 210, along with receiving module 220 and cache processing module 230, obtains backup data from data storage 260, identifies data segments from each data file, queries a deduplication server, searches a client's cache (e.g., memory cache 240 and/or disk cache 270) for fingerprint and data object information, and adds or deletes cache entries, as needed.

Receiving module 220 collects information received from the deduplication server. This information can include a list of fingerprints, a message indicating the existence of a data object, a data segment, and/or a data segment's fingerprint at the deduplication server, or a message indicating that a data object and/or data segment will be protected throughout the life of a backup process. This information can be received in response to a query sent by client 110 and can be received before, during, or after a backup process is performed on the client system.

Cache processing module 230 creates, manages, and updates memory cache 240 and disk cache 270. Typically, cache processing module 230 works with memory cache 240 to perform a backup operation on client 110. Typically, disk cache 270 is not relied upon by cache processing module 230 because disk cache is much slower than memory cache 240. However, a copy of memory cache is maintained at disk cache 270 in order to ensure that cache contents are not lost in the event of a failure or power down of client 110. Contents of memory cache 240 can be erased during a failure or power down of client 110, and thus, be unavailable upon correction of the failure or rebooting of client 110. In this case, memory cache 240 is able to obtain a copy of the cache contents from disk cache 270 prior to resuming a backup operation or prior to beginning a new backup operation in conjunction with cache processing module 230.

Disk 250 is a data storage mechanism for client 110. An example of disk 250 can include a hard-disk drive. Disk 250 is depicted as including data storage 260, as well as a disk cache 270. In addition, disk 250 can also include other files usable by the operating system executing on client 110.

Data storage 260 includes a stream of data files to be backed up. For example, a full backup can include backing up ten data files, all of which could be stored within data storage 260. Some of the data files stored within data storage 240 can include duplicate copies of data. Duplicate copies of data can also come about by storing data from multiple backups performed on the same set of data. This may occur, for example, if multiple backups are performed on the same set of data and some of that data remains unchanged. In some embodiments, data storage 240 can also store the breakdown of data files into individual data segments.

Figure 2B:
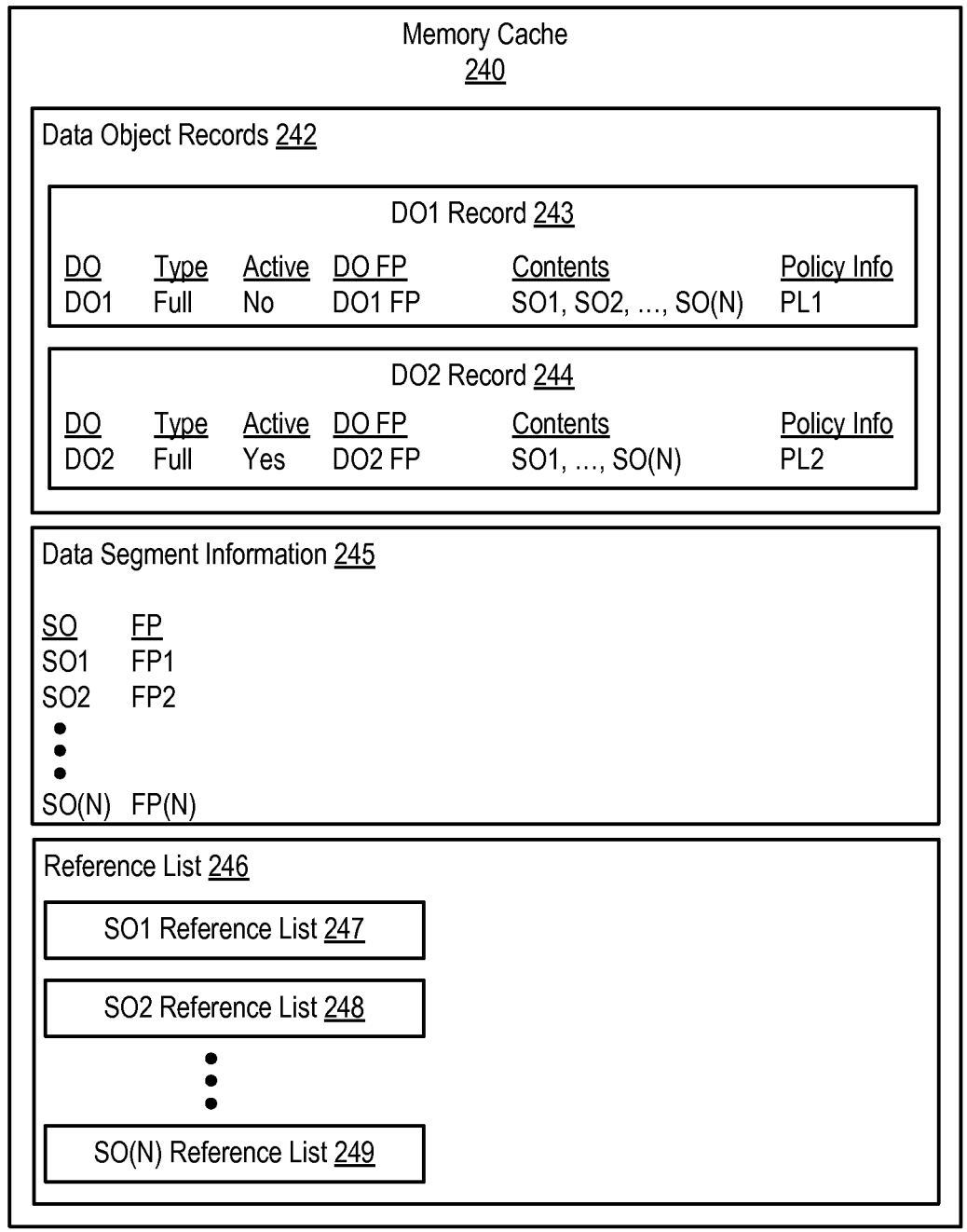
FIG. 2B illustrates an exemplary memory cache referenced by a client system, according to one embodiment of the present invention.

FIG. 2B illustrates an exemplary memory cache referenced by a client system. As shown, memory cache 240 includes data object records 242, data segment information 245, and a reference list 246.

Data object records 242 contain a list of data objects. Data objects are typically used to describe different backups performed on a client system. For example, a data object can exist for each full backup performed on a client system and for each incremental backup performed on the client system. As illustrated, data object records 242 includes a record for two different backups performed on the client system, DO1 record 243 and DO2 record 244. DO1 record 243 describes a full backup performed on the client system and DO2 record 244 describes a second full backup performed on the client system.

DO1 record 243 and DO2 record 244 consist of information regarding an active status, a fingerprint value, the contents of each data object, and policy information for each data object. The active status information is used to indicate which data objects are currently in an active state and therefore not to be erased by memory cache 240 during a memory cache clean-up process. In this case, DO1 is inactive and DO2 is active.

Data object content is an ordered fingerprint list of the data segments within the data object. For example, the first fingerprint in the data object content corresponds to the first data segment within the data object. The data object fingerprint is a fingerprint value generated from the data object content. This fingerprint value may be calculated, for example, by concatenating the fingerprint values of the individual segments represented by the data object. As shown, DO1 has a data object fingerprint of DO1 FP which is generated from its contents (e.g., the fingerprints of SO1, SO2, . . . , SO(N), which describe the data segments within DO1)). Similarly, DO2 has a data object fingerprint of DO2 FP which is generated from its contents (e.g., the fingerprints of SO1, SO(N), which describe the data segments within DO2). The fingerprint policy information PL1 and PL2 is used to describe backup policy information for each of DO1 and DO2, respectively.

Data segment information 245 maintains fingerprint information for individual data segments. These fingerprint values can be calculated in a number of different ways. For example, fingerprint values can be calculated by running a hashing algorithm on the contents of a data segment. As shown, data segment information 245 includes a list of data segments, with each data segment including its fingerprint value. For example, data segment information 245 could include information regarding N number of data segments, with data segment 1, SO1, having a fingerprint value FP1, a second data segment, SO2, having a fingerprint value FP2, and so on.

Reference list 246 is further broken down into individual reference lists, with each reference list corresponding to a respective data segment matching those in data segment information 245. As shown, reference list 246 includes an individual reference list for data segment 1 as SO1 reference list 247, a reference list for data segment 2 as SO2 reference list 248, and a reference list for data segment (N) as SO(N) reference list 249.

An individual reference list is used to list data objects that make reference to a particular data segment. For example, if DO1 contains SO1, SO2, . . . , SO(N), then a reference to DO1 is added to the SO1 reference list, the SO2 reference list, . . . , and the SO(N) reference list. Similarly, if DO2 contains SO1, SO(N), then a reference to DO2 is added to the SO1 reference list, . . . , and the SO(N) reference list.

In one embodiment, reference lists are used to track and identify data objects that make reference to the various data segments. Whenever a data object is removed from cache in an attempt to clear out the cache, and so make room for future data objects, references to the data object may also be removed from the respective reference lists. Thus, if DO1 and DO2 were removed from memory cache 250 (e.g., because both DOs were no longer active), the reference to DO1 and DO2 would be removed from the SO1 reference list. Once a data segment reference list is empty, the segment reference list can then be removed from memory cache 250, as well. Both of these removals are examples of a garbage collection process performed within memory cache 240.

Garbage collection is a type of memory management process performed in an effort to maximize computer resources by reclaiming memory occupied by objects that are no longer in use by a program. Garbage collection for a client's cache can vary in frequency. For example, a client cache may be cleared whenever the client cache is reaching its capacity limits or may be cleared after two successful full backups have been performed on a client system.

Although FIG. 2B illustrates the contents of memory cache 240, disk cache 270 also includes such contents as memory cache 240, such that disk cache 270 is able to act as a fail-safe for memory cache 240. This helps to ensure that memory cache contents are maintained elsewhere, and so available to be copied to the memory cache, in the event of a failure or shut down of client 110.

Figure 3A:
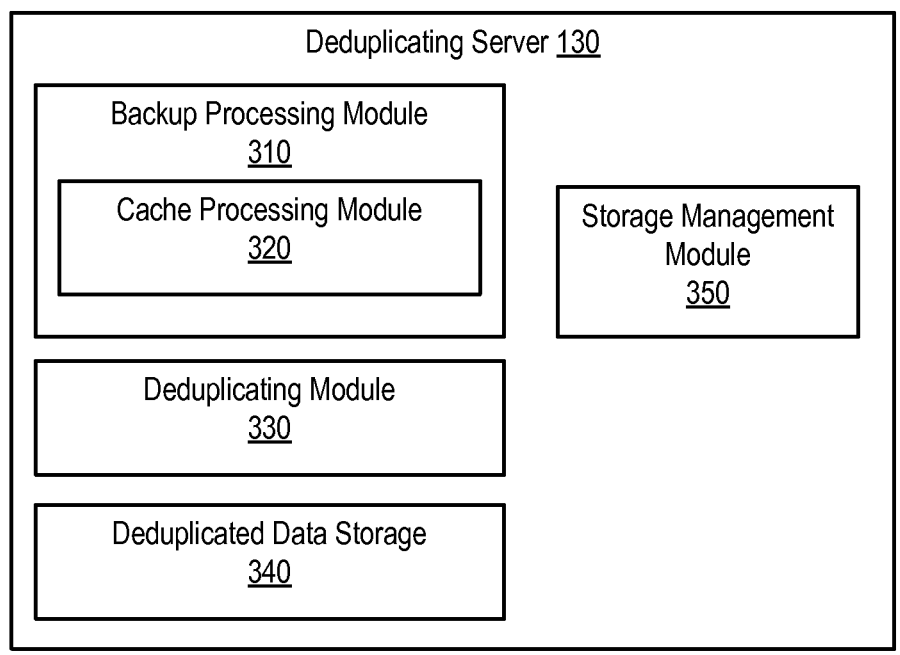
FIG. 3A illustrates an architecture of a deduplication server, according to one embodiment of the present invention.

FIG. 3A illustrates a deduplication server. Deduplication server 130 includes a backup processing module 310 (which includes a cache processing module 320), a deduplicating module 330, a deduplicated data storage 340, and a storage management module 350.

Backup processing module 310, along with cache processing module 320, coordinate with other client systems to enable a backup of a client's system. For example, backup processing module 320 handles the receipt of queries from client systems and/or the transmission of responses or messages from the deduplication server to a client system. A response or message from the deduplication server to a client system can include a list of matching fingerprints, a message indicating that a data segment and/or data object exists within the deduplication server, and/or a message indicating that a particular data segment and/or data object will be protected from inadvertent deletion during the course of a backup process.

Cache processing module 320 references storage management module 350 to determine which data segments, data objects, and/or data segment fingerprints exist within deduplicating server 130. Storage management module 350 maintains information regarding data objects performed on each client system, data segments, and/or data segment fingerprints. Thus, storage management module 350 can add information received from a client (e.g. a data object, data segment, or data segment fingerprint) to update its information or can retrieve the necessary information to respond to a client query.

Deduplicating module 330 removes duplicate copies of data received from client systems, if needed. In some embodiments, duplicate copies of data may be removed by the client system. In other embodiments, duplicate copies of data may exist, and be received by the deduplicating server 130, if the client system does not remove duplicate copies of data or if the client system performs multiple backup processes on the same set of data. Deduplicating module 330 determines what duplicate copies exist, if any, and subsequently removes the duplicate copies to ensure that only a single copy of data is stored within deduplicated data storage 340. Deduplicated data storage 340 stores backup copies of data once the data has been deduplicated by deduplicating module 330.

Figure 3B:
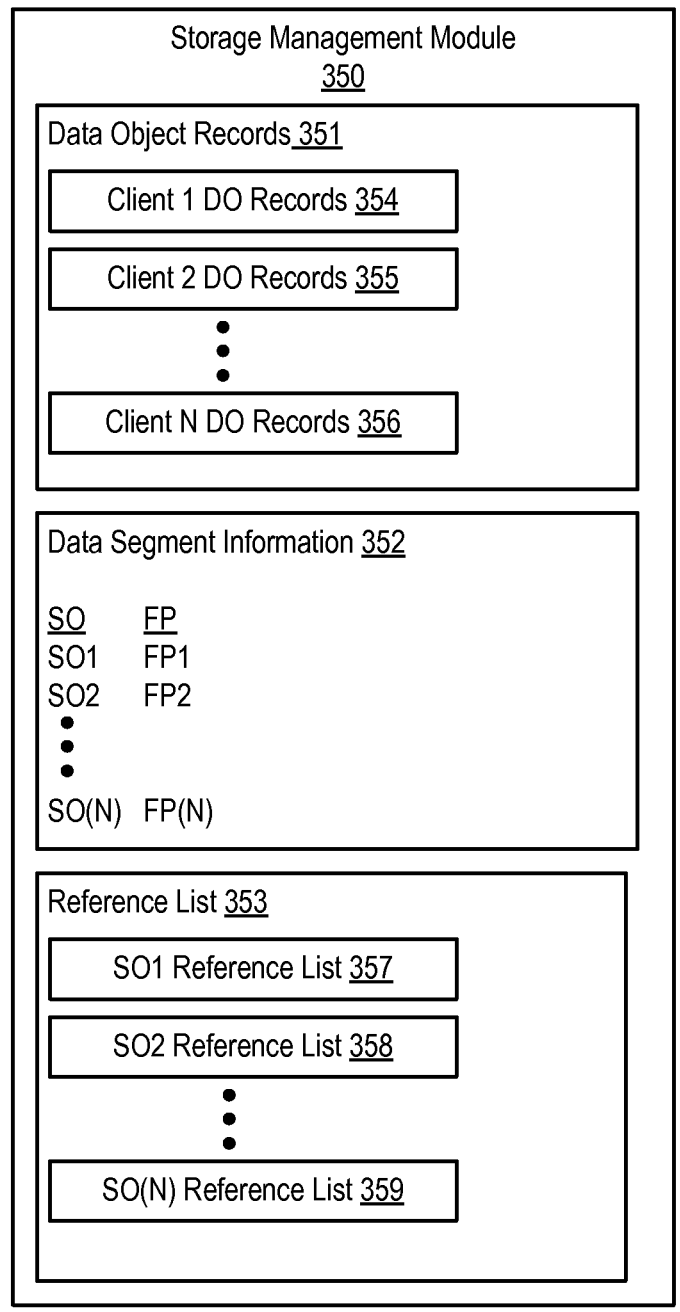
FIG. 3B illustrates an exemplary memory cache referenced by a deduplication server, according to one embodiment of the present invention.

FIG. 3B illustrates an exemplary memory management module referenced by a deduplication server. Memory management module 350 includes data object records 351, data segment information 352, and a reference list 353.

Data object records 351 include data object records for each client system. As shown, storage management module 350 includes data object records for Client 1, 2, . . . , N, illustrated as Client 1 DO records 354, Client 2 DO records 355, . . . , Client N DO records 356. Data object records reflect the data object records for each individual client system. Thus, storage management module 350 includes data object records of all full and incremental backups performed on each respective client system.

Data segment information 352 includes fingerprint information for each individual data segment. As shown, data segment information 352 includes a list of data segments 1, 2, . . . , N as SO1, SO2, SO(N) and the corresponding fingerprint values for each data segment. Typically, the list of data segments within data segment information 352 includes all data segments used at any one of the client systems.

A reference list 353 includes individual reference lists for each data segment. As shown, reference list 353 includes a reference list for data segments 1, 2, . . . , N as SO1 reference list 357, SO2 reference list 358, . . . , SO(N) reference list 359. Reference lists within storage management module 350 are used to track data segments that are referenced by data objects.

Figure 4:
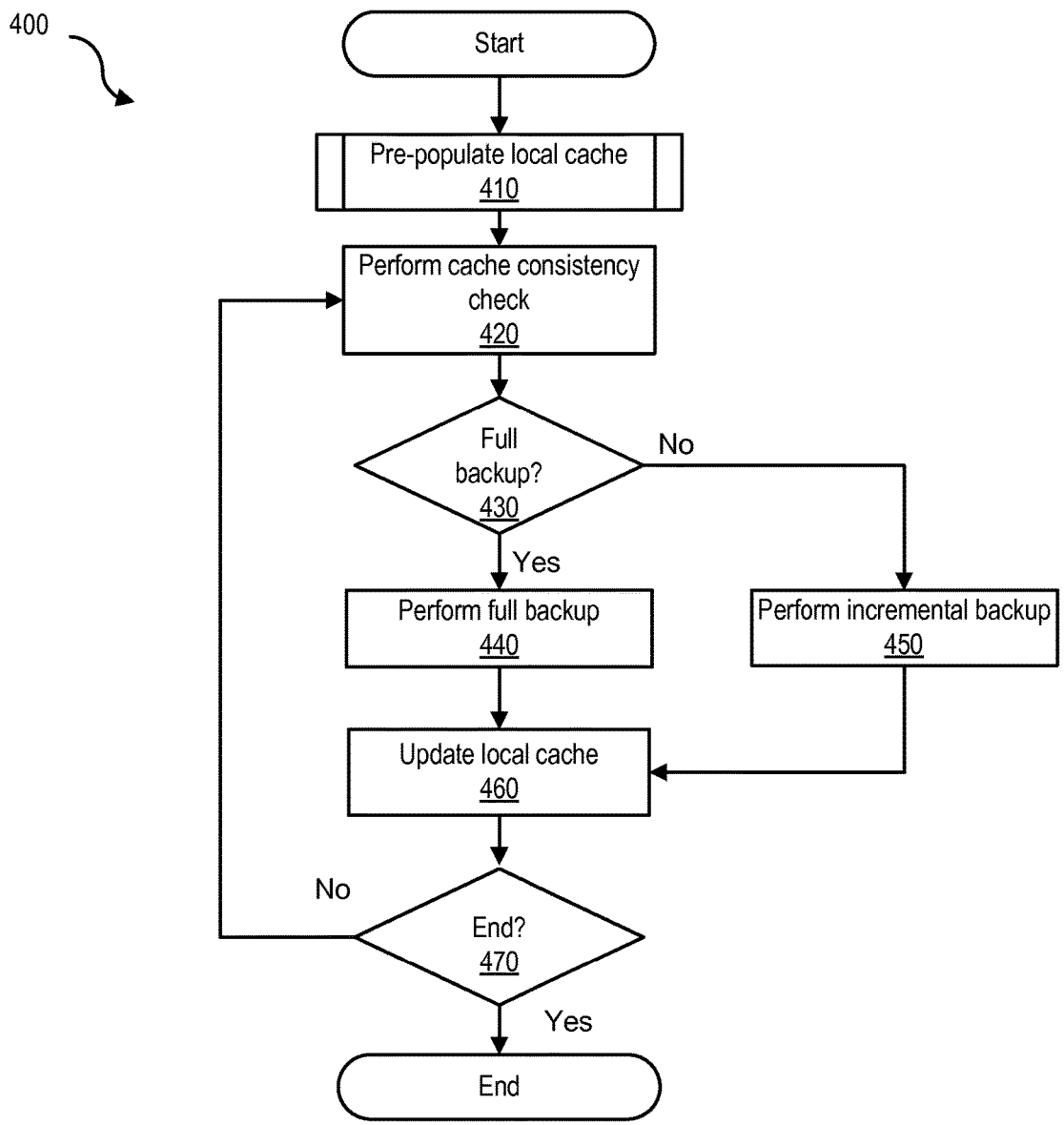
FIG. 4 is a flowchart illustrating an example process for caching fingerprints at a client system, according to one embodiment of the present invention.

FIG. 4 is a flowchart illustrating an example process 400 for caching fingerprints at a client system. In this example, the process begins at 410 where the cache of the client system is pre-populated. Pre-population occurs prior to performing the first full backup on a client system. Examples of how this pre-population is implemented are discussed in connection with FIGS. 5A and 5B.

A cache consistency check is then performed at 420. A cache consistency check is performed to ensure that fingerprints contained within a client's cache are currently stored at the deduplication server and are protected from being inadvertently deleted during a backup process. Once confirmation of fingerprint existence and data protection is received from the deduplication server, the fingerprints being referenced by a backup can be set to an active state within the client's cache to prevent inadvertent deletion of the fingerprints at the client cache. If this cache consistency check is not performed, data loss may occur. An example of the manner in which such cache consistency check is implemented is discussed in connection with FIG. 6.

After performing the consistency check, a determination is made with regard to whether a full backup is to be performed at 430. If a full backup is to be performed, the full backup is performed on the client system at 440. Otherwise, an incremental backup is performed at 450.

Once the full or incremental backup is complete, the client's cache is updated in 460. A client's cache is updated after each successful backup operation to indicate a variety of information regarding the backup. For example, a record can be created within cache to identify a data object representing the backup, the contents of the data object, the type of backup performed (either full or incremental), the policy information of the backup, and the status identifier for the backup (e.g., an active identifier to indicate whether a backup process for a particular data object is complete or ongoing). In addition, the same information can also be transmitted and added to the deduplication server.

A client's cache may be cleared out to remove some or all of the cache contents, as part of a garbage collection process. This can be performed, for example, after successfully completing a second or subsequent full backup on a client system or when the cache is reaching its capacity. When deciding which if any cache entries can be removed, a client will consider the state of a data object. If a data object is inactive, the data object may be removed from cache. Likewise, a segment reference list can be removed from cache if the segment reference list does not reference any data objects.

At 470, a determination is made as to whether the end of the process is reached (e.g, in the case where no further full or incremental backups are needed). If the end of the process is not reached, the process continues at 420 where a cache consistency check is performed in preparation for the next full or incremental backup. Otherwise, the process ends.

As mentioned, pre-population of a cache is performed prior to performing an initial backup of a client system. Typically, pre-population is performed in order to minimize the queries sent from the client system to the deduplication server, and to minimize the amount of responses sent from the deduplication server to the client system during an initial full backup. Two exemplary ways to perform pre-population of a client cache are discussed in FIGS. 5A and 5B.

Figure 5A:
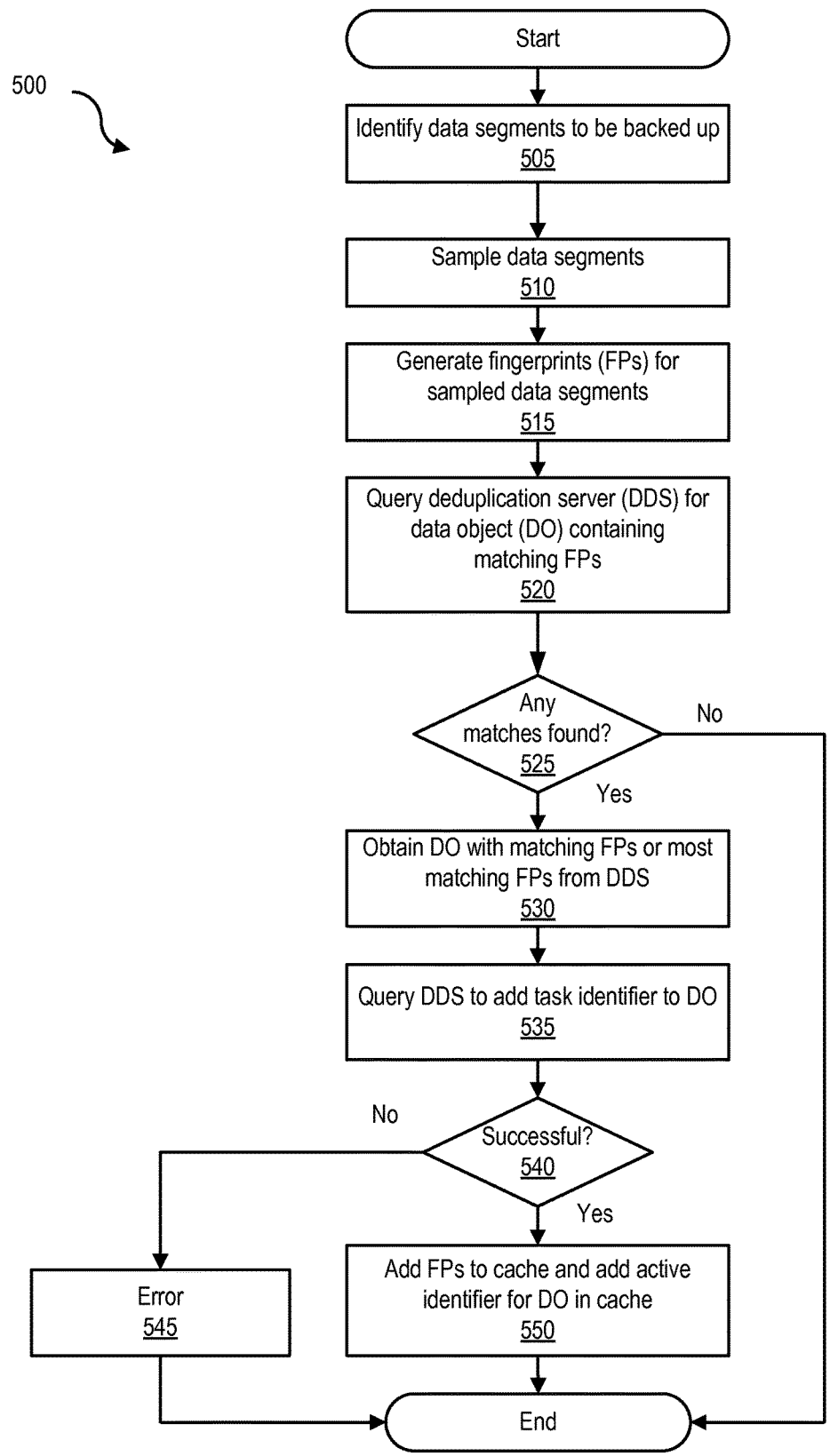
FIG. 5A is a flowchart illustrating an example process for pre-populating a cache at a client system, according to one embodiment of the present invention.

FIG. 5A illustrates the first example process 500 for pre-populating a client cache. The process begins at 505, where data segments to be backed up are identified by a client. Typically, a backup data stream is made up of some number of well-delineated units of data (e.g. a set of files) that are to be backed up during the backup process. These files are broken down into data segments.

At 510, a portion of these data segments are sampled. The sampling process can be performed to sample a certain number of data segments. For example, data segments can be sampled in such a manner as to select the first data segment within each data file to be backed up. Typically, the higher the sample rate, the higher the probability of receiving a likely matching data object (e.g., a data object that closely resembles the data to be backed up) from a deduplication server.

Once sampled, a fingerprint is generated for each corresponding data segment, as shown in 515. A fingerprint can be generated for a data segment based on the metadata and/or actual data within the data segment. An example of a fingerprint generating algorithm includes calculating a hash value, where the application of the hash algorithm results in no hash collisions, or statistically insignificant probability of such collisions. A fingerprint value is calculated to be, and so it is intended to be, unique to a data segment and thus distinguishable for each corresponding data segment.

At 520, the client queries the deduplication server to determine if the deduplication server has a data object that contains matching fingerprints for the sampled data segments. When the query is received by the deduplication server, the deduplication server will search its segment reference lists to determine if any data objects exist that contain at least some matching fingerprints for the sampled data segments, as in 525. In some cases, the deduplication server may not find a data object that contains a fingerprint match for all the sampled data segments. In such a case, the deduplication server may find a data object that contains the majority of the sampled data segments, and use that data object instead.

As will be appreciated in light of the present disclosure, the fingerprints of the data object are sent to the deduplication server with the expectation that the deduplication server will have data objects that include data segments with matching fingerprints, given that the same data segments may have been sent to the deduplication server by another client system, by the same client system through other means such as copying to a mobile storage device, by shipping the mobile storage device to the deduplication server, or by backing up data to the deduplication server. In the event that the deduplication server does not find a data object with any matching fingerprints, a message indicating such can be sent to the client, and the pre-populating process ends.

Often, however, the deduplication server will find several data objects with some matching fingerprints being referenced in a segment reference list. In this case, the deduplication server can then select one or more data objects to return to the client. This may be performed by sorting the data objects with matching fingerprints and finding the data object that contains the most matching fingerprints. Alternatively, the deduplication server can simply send a data object that includes the most frequently encountered data segments. The data object(s) thus identified is then sent to the client system. The client system obtains this data object(s) at 530.

Thereafter, the client system queries the deduplication server to add a task identifier corresponding to the current backup operation to the corresponding data object(s), in 535, to prevent inadvertent deletion by the deduplication server. This query results in the deduplication server attempting to add the task identifier as a temporary reference to the data object(s) corresponding to the matching fingerprints. This task identifier is intended to last throughout the duration of a backup operation. For example, such a task identifier can be associated with a storage task that represents, at least in part, the session used for client/server communications between the client and the deduplication server, lasting for the duration that the session is active. Whenever the deduplication server adds a task identifier to a data object, the deduplication server promises to protect the data object, as well as its corresponding data segments, from being deleted at least for the duration of a backup process. A comparable process can also be used to protect individual data segments.

At 540, a determination is made as to whether the deduplication server has successfully added a task identifier to the data object(s). If the deduplication server is unable to add a task identifier to the data object(s), the process will identify an error at 545. Alternatively, if the task identifier is successfully added to the data object(s), the client can then add the data objects and/or matching fingerprints to cache and add an active identifier to the data object and/or the data segment reference list, as shown in 550. Once this is complete, the process ends.

Figure 5B:
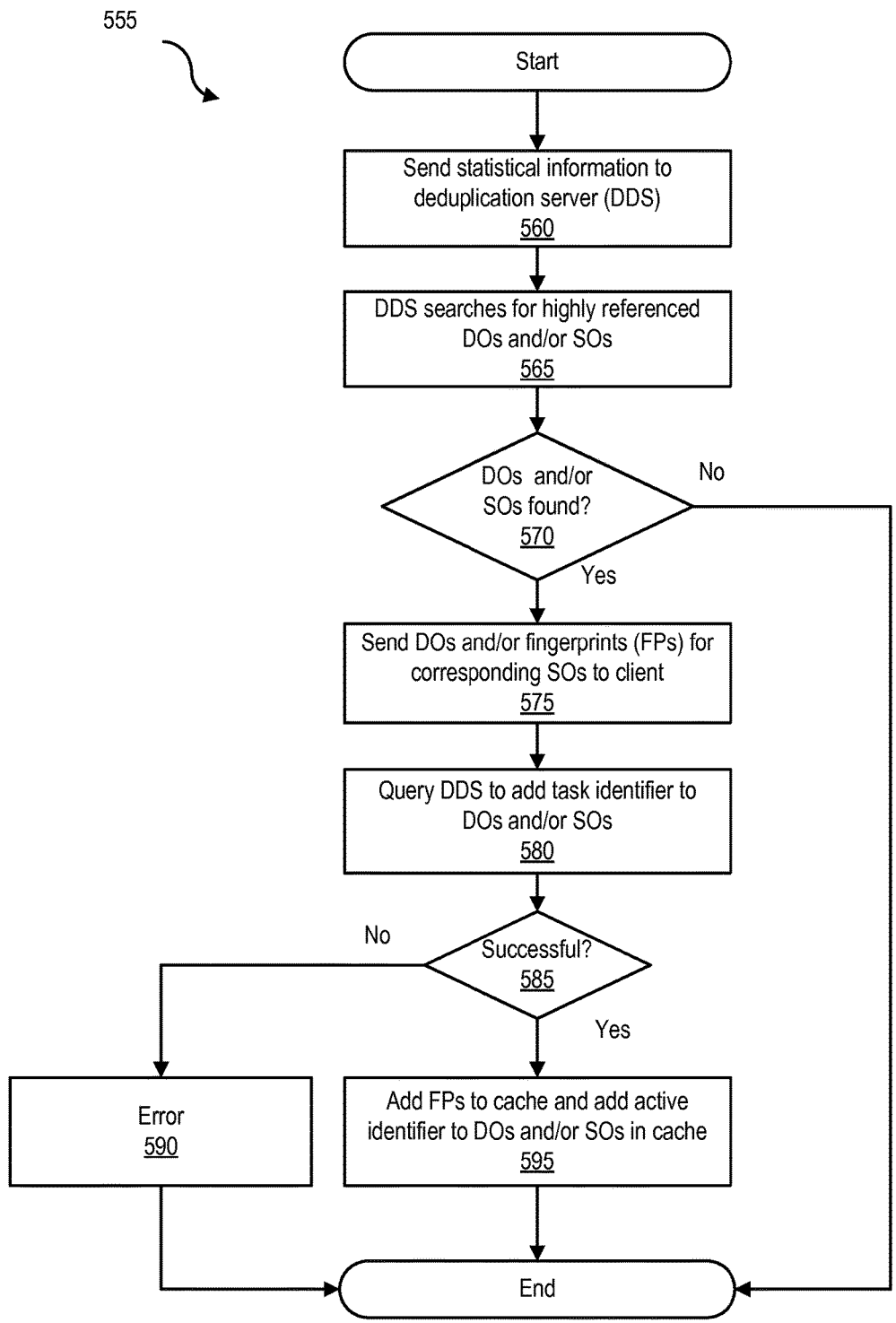
FIG. 5B is a flowchart illustrating another example process for pre-populating a cache at a client system, according to one embodiment of the present invention.

FIG. 5B illustrates a second example process 555 for pre-populating a client cache. The process begins at 560, where the client system sends some form of statistical information to a deduplication server. This statistical information may include information regarding the client or the backup process itself.

At 565, the deduplication server analyzes this statistical information and searches for data objects and/or data segments that are highly referenced by other backups, a determination made at 570. Highly referenced data segments may include, for example, popular data segments on the deduplication server that may also be part of the client's backup data set. In the event that the deduplication server does not find any data objects and/or data segments that are highly referenced by other backups, the process ends.

On the contrary, if the deduplication server does find data objects and/or data segments that are highly referenced by other backups, these data objects and/or fingerprints corresponding to the data segments are sent to the client system, as shown in 575.

Thereafter, the client system queries the deduplication server to add a task identifier to the corresponding data object(s) and/or data segment(s), in 580, to prevent inadvertent deletion by the deduplication server. At 585, a determination is made as to whether the deduplication server has successfully added a task identifier to the data object(s) and/or data segments. If the deduplication server is unable to add a task identifier to the data object(s) and/or data segment(s), the process will identify an error at 590. Alternatively, if the task identifier is successfully added to the data object(s) and/or data segment(s), the client can then add the data objects and/or matching fingerprints to cache and add an active identifier to the data object and/or the data segment(s) by way of the data segment reference list, as shown in 595. Once this is complete, the process ends.

Figure 6:
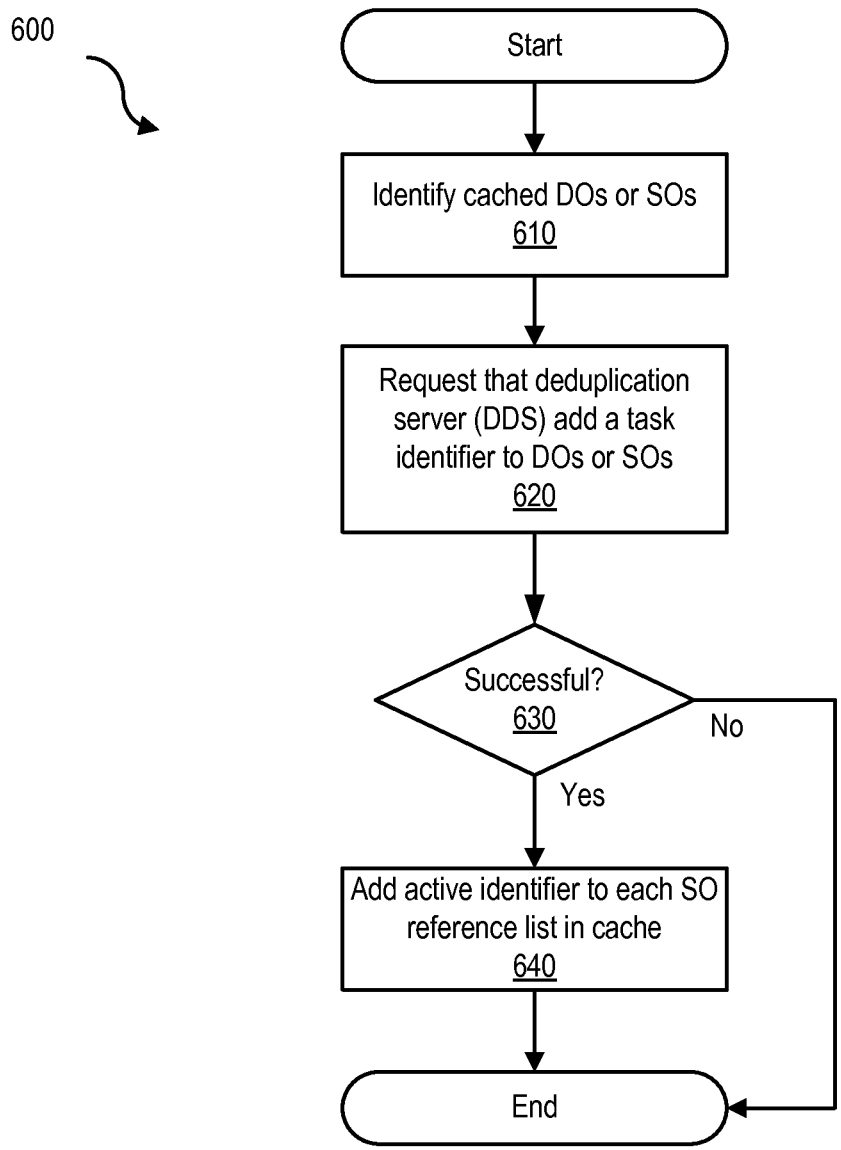
FIG. 6 is a flowchart illustrating an example process for performing a cache consistency check prior to performing a backup on a client system, according to one embodiment of the present invention.

FIG. 6 is a flowchart illustrating an example of a process 600 for performing a cache consistency check prior to performing a backup on a client system. A cache consistency check is performed before any backup process is performed on a client system.

The process begins at 610 with the identification of data objects and/or data segments in cache. If previous backups have been performed on a client system, data objects that pertain to the previous full and incremental backups performed on the client system are identified at 610. Otherwise, if no previous backups have been performed, each data object and/or data segment received by the client system during pre-population is identified at 610.

The process continues at 620 where the client system requests that the deduplication server add a task identifier to the data objects and/or data segments identified in 610. This request can occur via a message or query to the deduplication server and can include an identification of the data objects and/or data segments to be held active throughout the life of a backup process.

The deduplication server attempts to add a task identifier to the data objects and/or data segments, as shown in 630. If the client system does not receive confirmation from the deduplication server that a task identifier has been added to the data objects and/or data segments, the process ends.

Alternatively, if the client system does receive confirmation that the deduplication server has added a task identifier to the data objects and/or data segments, then the client system marks each corresponding data segment as active by adding an active identifier to each data segment reference list, as shown in 640. By doing so, consistency can be maintained between the client cache and the deduplication server. At this point, the process ends. An incremental or full backup can then be started on the client system by referencing the cache.

Figure 7:
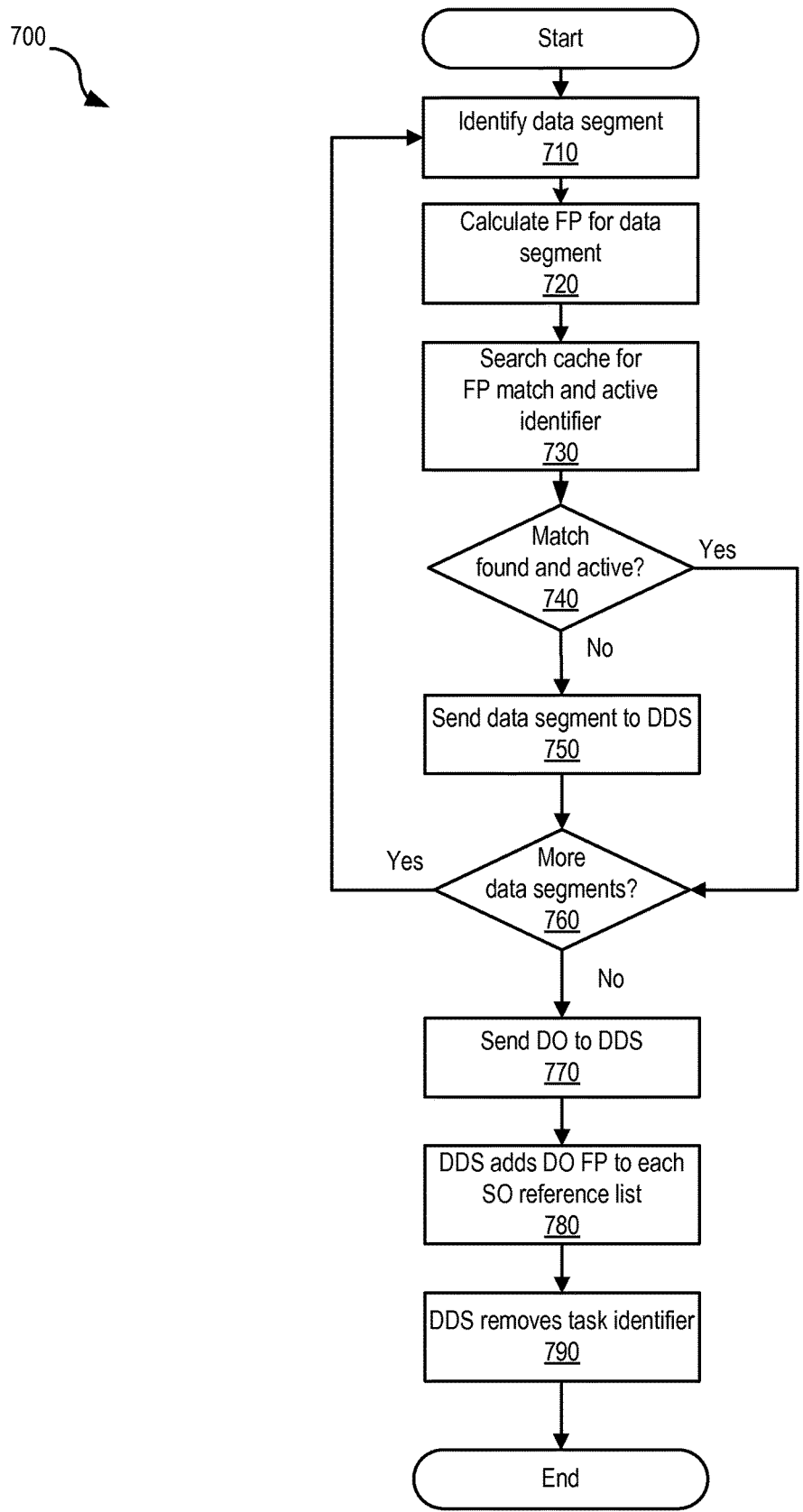
FIG. 7 is a flowchart illustrating an example process for performing a backup using a cache at a client system, according to one embodiment of the present invention.

FIG. 7 is a flowchart illustrating an example of a process 700 for performing a backup operation using a cache at a client system. The process begins at 710 where a data segment to be backed up is identified.

Once identified, a fingerprint corresponding to the data segment can be calculated in 720. A fingerprint is typically calculated based on the contents of the data segment. An example of a fingerprint is a hash value. Because fingerprints are calculated based on the metadata and/or contents of a data segment, the fingerprint for each data segment should be unique and distinguishable from other fingerprints for other data segments, in order to uniquely identify those data segment. However, if a data segment is a duplicate copy of a data segment, then both data segments should produce identical fingerprints.

At 730, the client system searches its cache to determine if the fingerprint calculated in 720 is identical to a fingerprint within its cache and to determine if the matching fingerprint includes an active identifier, as shown in 740. A client's cache can be empty or can contain fingerprint entries that were previously entered, either during a previous full or incremental backup.

If the cache processing module of the client determines that an identical fingerprint is within the cache and includes an active identifier, the analysis for that particular data segment is complete and additional data segments (if any) can then be analyzed at 760. On the contrary, if the cache processing module of the client determines that no identical fingerprint is found within the cache, then the client system sends the corresponding data segment to the deduplication server at 750.

The process then continues at 760 to determine whether more data segments exist. If more data segments exist, the process returns to 710 to begin analyzing the next data segment. If no further data segments exist, the process continues at 770 where the data object for the backup process is sent to the deduplication server. Upon receipt of the data object, the deduplication server adds the data object fingerprint to each data segment reference list corresponding to the data segments within the data object, as shown in 780. At 790, the task identifier for the recently completed backup process is considered expired and thus removed from the deduplication server reference list of operations. The process then ends.

Figure 8:
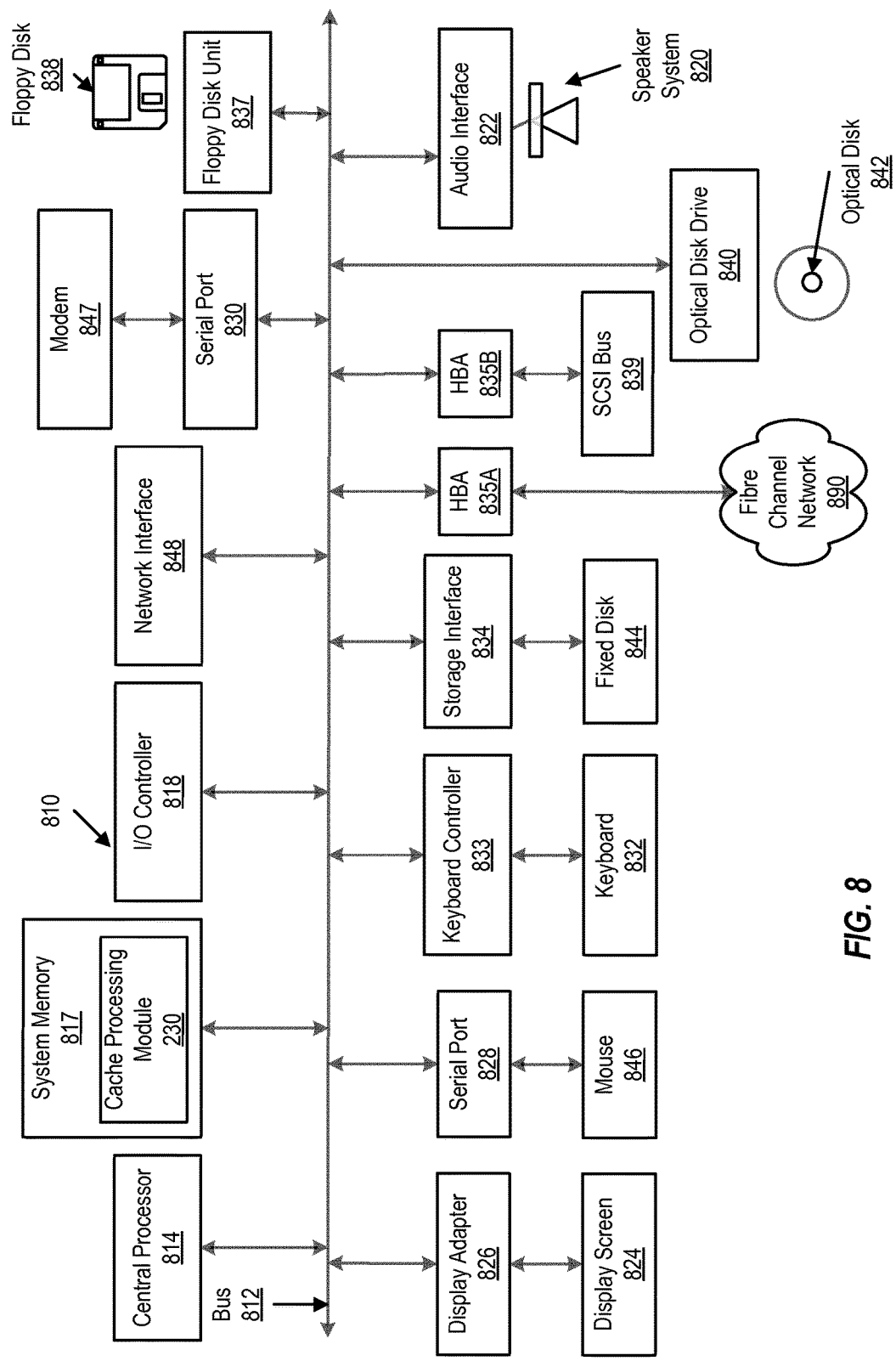
FIG. 8 is a block diagram of a computing system, according to one embodiment of the present invention.

FIG. 8 is a block diagram of a computing system 810 suitable for implementing the deduplication of messages as described above. Computer system 810 includes a bus 812 which interconnects major subsystems of computer system 810, such as a central processor 814, a system memory 817 (typically RAM, but which can also include ROM, flash RAM, or the like, and which can also include software implementing a cache processing module 230 like that shown in FIG. 2A), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk unit 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer-readable medium, such as a hard disk drive (e.g., fixed disk 844), an optical drive (e.g., optical disk drive 840), a floppy disk unit 837, or other storage medium. Additionally, applications can be in the form of electronic signals modulated in accordance with the application and data communication technology when accessed via modem 847 or network interface 848.

Storage interface 834, as with the other storage interfaces of computer system 810, can connect to a standard computer-readable medium for storage and/or retrieval of information, such as a fixed disk drive 844. Fixed disk drive 844 can be a part of computer system 810 or can be separate and accessed through other interface systems. Modem 847 can provide a direct connection to a remote server via a telephone link or to the Internet via an internet service provider (ISP). Network interface 848 can provide a direct connection to a remote server via a direct network link to the Internet via a POP (point of presence). Network interface 848 can provide such connection using wireless techniques, including digital cellular telephone connection, Cellular Digital Packet Data (CDPD) connection, digital satellite data connection or the like.

Many other devices or subsystems (not shown) can be connected in a similar manner (e.g., document scanners, digital cameras, and so on). Conversely, all of the devices shown in FIG. 8 need not be present to practice the present invention. The devices and subsystems can be interconnected in different ways from that shown in FIG. 8. The operation of a computer system is readily known in the art and is not discussed in detail in this application. Code to implement the present invention can be stored in computer-readable storage media such as one or more of system memory 817, fixed disk 844, optical disk 842, or floppy disk 838. The operating system provided on computer system 810 can be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention can include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
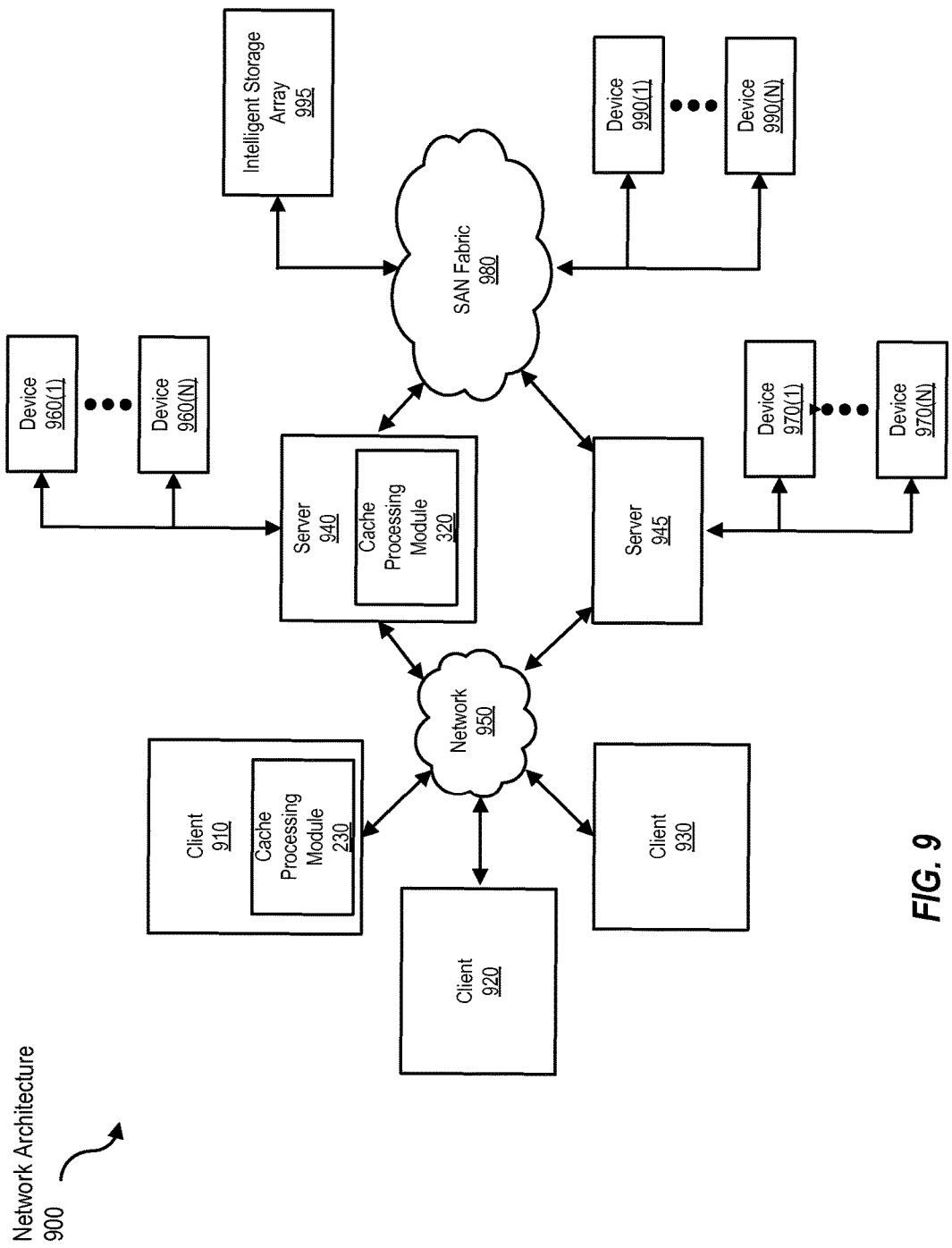
FIG. 9 is a block diagram of a network system, according to one embodiment of the present invention.

FIG. 9 is a block diagram of a network architecture 900 in which client systems 910, 920, and 930 and servers 940 and 945 can be coupled to a network 950. Client systems 910, 920, and 930 generally represent any type or form of computing device or system, such as computing system 810 in FIG. 8.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, client systems 910, 920, and/or 930 and/or servers 940 and/or 945 can include a cache processing module 230 and 320, as shown in FIGS. 2A and 3A.

As illustrated in FIG. 9, one or more storage devices 960(1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS).

Servers 940 and 945 can also be connected to a storage area network (SAN) fabric 980. SAN fabric 980 generally represents any type or form of computer network or architecture capable of facilitating communication between multiple storage devices. SAN fabric 980 can facilitate communication between servers 940 and 945 and a plurality of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computing system 810 of FIG. 8, a communication interface can be used to provide connectivity between each client system 910, 920, and 930 and network 950. Client systems 910, 920, and 930 can be able to access information on server 940 or 945 using, for example, a web browser or other client software. Such software can allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in server 940, run by server 945, and distributed to client systems 910, 920, and 930 over network 950.

In some examples, all or a portion of the computing devices in FIGS. 1, 2A-3B, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a cache processing module 230 in FIG. 2A can transform data segments into fingerprints and can also transform fingerprints into cache entries. The same applies for cache processing module 320 in FIG. 3A.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   transmitting statistical information to a deduplication server, wherein
      the statistical information comprises information associated with a client system or a backup process;
   receiving one or more items from the client system at the deduplication server, wherein
      each of the one or more items comprises a data object or a fingerprint for a data segment that is referenced by the backup process;
   transmitting a request to the deduplication server, wherein
      the request instructs the deduplication server to add a task identifier to each of the one or more items stored at the deduplication server, and
      addition of the task identifier to the each of the one or more items prevents the each of the one or more items stored at the deduplication server from being deleted from the deduplication server during the backup process; and
   in response to a determination that the deduplication server has successfully added the task identifier to the each of the one or more items stored at the deduplication server,
      adding a fingerprint for the each of the one or more items in a cache, wherein
         the cache is stored at the client system, and
      adding an active identifier to the each of the one or more items in the cache, wherein
         the active identifier indicates that the each of the one or more items stored at the deduplication server will be maintained at the deduplication server during the backup process.

2. A method comprising:
   identifying a set of data segments, wherein
      the set of data segments comprises one or more data segments, and
      the one or more data segments are to be backed up during a backup process;
   generating a fingerprint for each data segment of a subset of data segments, wherein
      the subset of data segments represents the one or more data segments of the set of data segments;
   querying a deduplication server for a data object, wherein
      the data object comprises a matching fingerprint, and
      the matching fingerprint matches a fingerprint of at least one data segment from the subset of data segments;
   receiving the data object comprising the matching fingerprint from the deduplication server; and
   in response to receiving the data object comprising the matching fingerprint from the deduplication server,
      adding a fingerprint to a cache, and
      preventing deletion of the data object from the deduplication server during the backup process by adding a task identifier to the data object; and
   in response to a determination that the deduplication server has successfully added the task identifier to the data object stored at the deduplication server,
      adding the fingerprint for each data segment in the subset of data segments that comprise the matching fingerprint in the data object in the cache, wherein
         the cache is stored at a client system, and
      adding an active identifier to the data object in the cache, wherein the active identifier indicates that the data object stored at the deduplication server will be maintained at the deduplication server during the backup process.

3. The method of claim 2, further comprising:
   sampling the set of data segments to create the subset of data segments, wherein
      the sampling comprises selecting a certain number of data segments from the set of data segments.

4. The method of claim 2, further comprising:
   determining whether any data objects at the deduplication server comprise the matching fingerprint.

5. The method of claim 4, further comprising:
   identifying one or more data objects at the deduplication server that comprise the matching fingerprint;
   selecting the data object from the one or more data objects; and
   transmitting the data object to a client system.

6. The method of claim 2, further comprising:
   receiving the data object at the client system, wherein
      the data object comprises at least one of
         a matching fingerprint for all data segments in the subset of data segments,
         a greatest number of matching fingerprints for a greatest number of data segments in the subset of data segments, or
         a greatest number of frequently encountered data segments in the subset of data segments.

7. The method of claim 2, further comprising:
   performing the backup process for the client system using the cache, wherein
      the performing comprises
         searching the cache for a fingerprint match and the active identifier for a given data segment,
         if a fingerprint match and the active identifier are found in the cache for the given data segment, abstaining from sending the given data segment to the deduplication server, and
         if a fingerprint match and the active identifier are not found in the cache for the given data segment, transmitting the given data segment to the deduplication server.

8. A non-transitory computer readable storage medium comprising instructions executable to:
   identify a set of data segments, wherein
      the set of data segments comprises one or more data segments, and
      the one or more data segments are to be backed up during a backup process;
   generate a fingerprint for each data segment of a subset of data segments, wherein
      the subset of data segments represents the one or more data segments of the set of data segments;
   query a deduplication server for a data object, wherein
      the data object comprises a matching fingerprint, and
      the matching fingerprint matches a fingerprint of at least one data segment from the subset of data segments;
   receive the data object comprising the matching fingerprint from the deduplication server; and
   in response to receiving the data object comprising the matching fingerprint from the deduplication server,
      add a fingerprint to a cache, and
      prevent deletion of the data object from the deduplication server during the backup process by adding a task identifier to the data object; and in response to a determination that the deduplication server has successfully added the task identifier to the data object stored at the deduplication server,
    add the fingerprint for each data segment in the subset of data segments that comprise the matching fingerprint in the data object in the cache, wherein
        the cache is stored at a client system, and
    add an active identifier to the data object in the cache, wherein the active identifier indicates that the data object stored at the deduplication server will be maintained at the deduplication server during the backup process.

9. The non-transitory computer readable storage medium of claim 8, wherein the program instructions are further executable to:
    sample the set of data segments to create the subset of data segments, wherein
        the sampling comprises selecting a certain number of data segments from the set of data segments.

10. The non-transitory computer readable storage medium of claim 8, wherein the program instructions are further executable to:
    determine whether any data objects at the deduplication server comprise the matching fingerprint.

11. The non-transitory computer readable storage medium of claim 10, wherein the program instructions are further executable to:
    identify one or more data objects at the deduplication server that comprise the matching fingerprint;
    select the data object from the one or more data objects; and
    transmit the data object to a client system.

12. The non-transitory computer readable storage medium of claim 8, wherein the program instructions are further executable to:
    receive the data object at the client system, wherein the data object comprises at least one of
        a matching fingerprint for all data segments in the subset of data segments,
        a greatest number of matching fingerprints for a greatest number of data segments in the subset of data segments, or
        a greatest number of frequently encountered data segments in the subset of data segments.

13. The non-transitory computer readable storage medium of claim 8, wherein the program instructions are further executable to:
    perform the backup process for the client system using the cache, wherein
        the instructions to perform the backup process are executable to
            search the cache for a fingerprint match and the active identifier for a given data segment,
            abstain from sending the given data segment to the deduplication server, if a fingerprint match and the active identifier are found in the cache for the given data segment, and
            transmit the given data segment to the deduplication server, if a fingerprint match and the active identifier are not found in the cache for the given data segment.

14. A system comprising:
    one or more processors; and
    memory coupled to the processors, wherein the memory stored program instructions executable by the one or more processors to:
        identify a set of data segments, wherein
            the set of data segments comprises one or more data segments, and
            the one or more data segments are to be backed up during a backup process;
        generate a fingerprint for each data segment of a subset of data segments, wherein
            the subset of data segments represents the one or more data segments of the set of data segments;
        query a deduplication server for a data object, wherein
            the data object comprises a matching fingerprint, and
            the matching fingerprint matches a fingerprint of at least one data segment from the subset of data segments;
        receive the data object comprising the matching fingerprint from the deduplication server; and
        in response to receiving the data object comprising the matching fingerprint from the deduplication server,
            add a fingerprint to a cache, and
            prevent deletion of the data object from the deduplication server during the backup process by adding a task identifier to the data object; and
        in response to a determination that the deduplication server has successfully added the task identifier to the data object stored at the deduplication server,
            add the fingerprint for each data segment in the subset of data segments that comprise the matching fingerprint in the data object in the cache, wherein
                the cache is stored at a client system, and
            add an active identifier to the data object in the cache, wherein the active identifier indicates that the data object stored at the deduplication server will be maintained at the deduplication server during the backup process.

15. The system of claim 14, wherein the program instructions are further executable to:
    determine whether any data objects at the deduplication server comprise the matching fingerprint,
    identify one or more data objects at the deduplication server that comprise the matching fingerprint,
    select the data object from the one or more data objects, and
    transmit the data object to the client system.

16. The system of claim 14, wherein the program instructions are further executable to:
    receive the data object at the client system, wherein the data object comprises at least one of
        a matching fingerprint for all data segments in the subset of data segments,
        a greatest number of matching fingerprints for a greatest number of data segments in the subset of data segments, or
        a greatest number of frequently encountered data segments in the subset of data segments.

17. A non-transitory computer readable storage medium comprising instructions executable to:
    transmit statistical information to a deduplication server, wherein
        the statistical information comprises information associated with a client system or a backup process;
    receive one or more items from the client system at the deduplication server, wherein
        each of the one or more items comprises a data object or a fingerprint for a data segment that is referenced by the backup process;
    transmit a request to the deduplication server, wherein
        the request instructs the deduplication server to add a task identifier to each of the one or more items stored at the deduplication server, and addition of the task identifier to the each of the one or more items prevents the each of the one or more items stored at the deduplication server from being deleted from the deduplication server during the backup process; and in response to a determination that the deduplication server has successfully added the task identifier to the each of the one or more items stored at the deduplication server,
- add a fingerprint for the each of the one or more items in a cache, wherein
  - the cache is stored at the client system, and
- add an active identifier to the each of the one or more items in the cache, wherein the active identifier indicates that the each of the one or more items stored at the deduplication server will be maintained at the deduplication server during the backup process.

18. A system comprising:
one or more processors; and
memory coupled to the processors, wherein the memory stores program instructions executable by the one or more processors to:
transmit statistical information to a deduplication server, wherein
- the statistical information comprises information associated with a client system or a backup process;

receive one or more items from the client system at the deduplication server, wherein
- each of the one or more items comprises a data object or a fingerprint for a data segment that is referenced by the backup process;

transmit a request to the deduplication server, wherein
- the request instructs the deduplication server to add a task identifier to each of the one or more items stored at the deduplication server, and
- addition of the task identifier to the each of the one or more items prevents the each of the one or more items stored at the deduplication server from being deleted from the deduplication server during the backup process; and in response to a determination that the deduplication server has successfully added the task identifier to the each of the one or more items stored at the deduplication server,
- add a fingerprint for the each of the one or more items in a cache, wherein
  - the cache is stored at the client system, and
- add an active identifier to the each of the one or more items in the cache, wherein the active identifier indicates that the each of the one or more items stored at the deduplication server will be maintained at the deduplication server during the backup process.

* * * * *